United States Patent [19]

Dietz

[11] 4,203,468
[45] May 20, 1980

[54] COUPLING FOR JOINING PARTS OF FLUID CONVEYING AND FLUID CONTROLLING DEVICES, AND VALVES UTILIZING SAID COUPLINGS

[75] Inventor: William A. Dietz, Los Angeles, Calif.

[73] Assignee: Schurz Corporation, Los Angeles, Calif.

[21] Appl. No.: 873,356

[22] Filed: Jan. 30, 1978

[51] Int. Cl.² .................................................. F16K 31/46
[52] U.S. Cl. ................................. 137/624.11; 251/294; 137/454.2
[58] Field of Search .................... 285/305; 137/624.13, 137/624.15, 624.17, 454.2; 251/294

[56] References Cited

U.S. PATENT DOCUMENTS

| | | | |
|---|---|---|---|
| 1,866,298 | 7/1932 | Didinger | 251/294 X |
| 2,353,038 | 7/1944 | Jackson | 137/624.13 X |
| 3,103,231 | 9/1963 | Moen | 137/454.2 |
| 3,314,696 | 4/1967 | Ferguson | 285/305 X |
| 3,594,828 | 7/1971 | Seek | 251/294 |
| 3,628,768 | 12/1971 | Hutt | 285/305 X |
| 3,753,582 | 8/1973 | Graham | 285/305 X |
| 4,109,672 | 8/1978 | Szemeredi | 137/454.2 X |

Primary Examiner—Alan Cohan
Attorney, Agent, or Firm—Donald D. Mon

[57] ABSTRACT

A coupling for joining parts of fluid conveying devices such as conduits, and fluid controlling devices such as valves, and devices utilizing said couplings. The coupling comprises a receptacle with a receptacle wall having an internal peripheral sealing surface, an opening to the sealing surface, and at least one slit extending through the receptacle wall and opening into the sealing surface. A coupled member has an external sealing surface adapted to seal with the other sealing surface, and a retention shoulder adapted to pass through the opening to a position beyond the slit. A coupler has a key which passes through the slit, engaging the receptacle wall and said shoulder to hold the coupled member to the receptacle. Valves can be constructed with this coupling, the receptacle and the coupled member further including parts of valving structures, for example a valve poppet operated by a cable or cable-and-spring which in turn is controlled by a timer.

2 Claims, 6 Drawing Figures

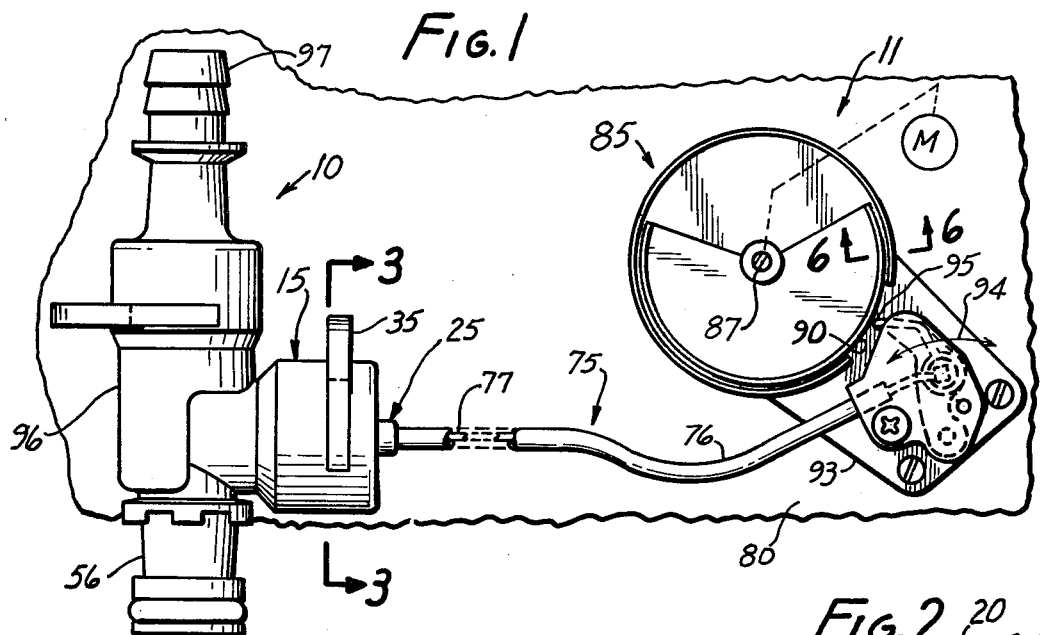
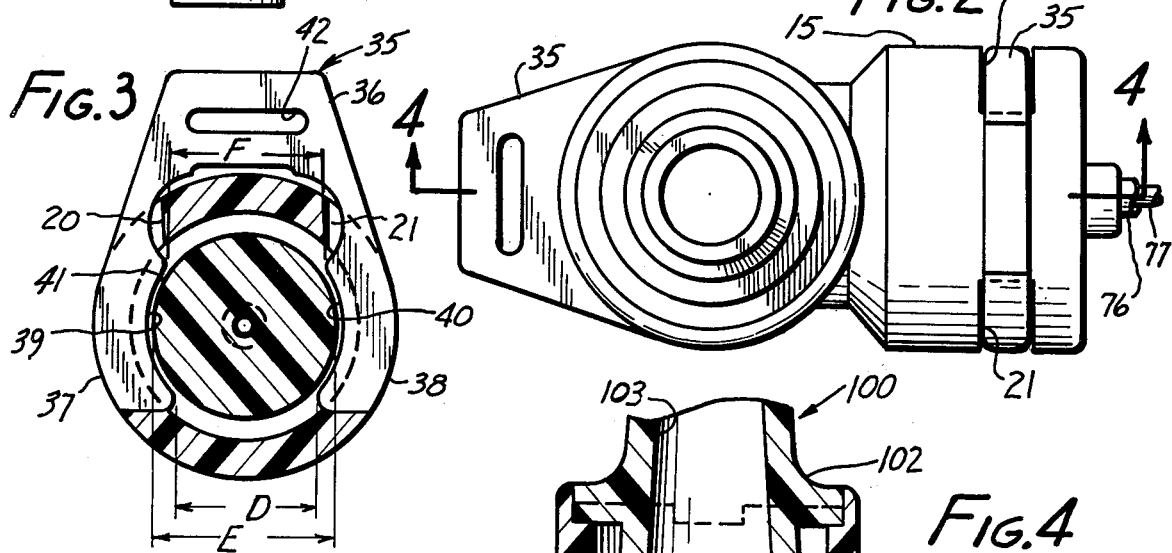
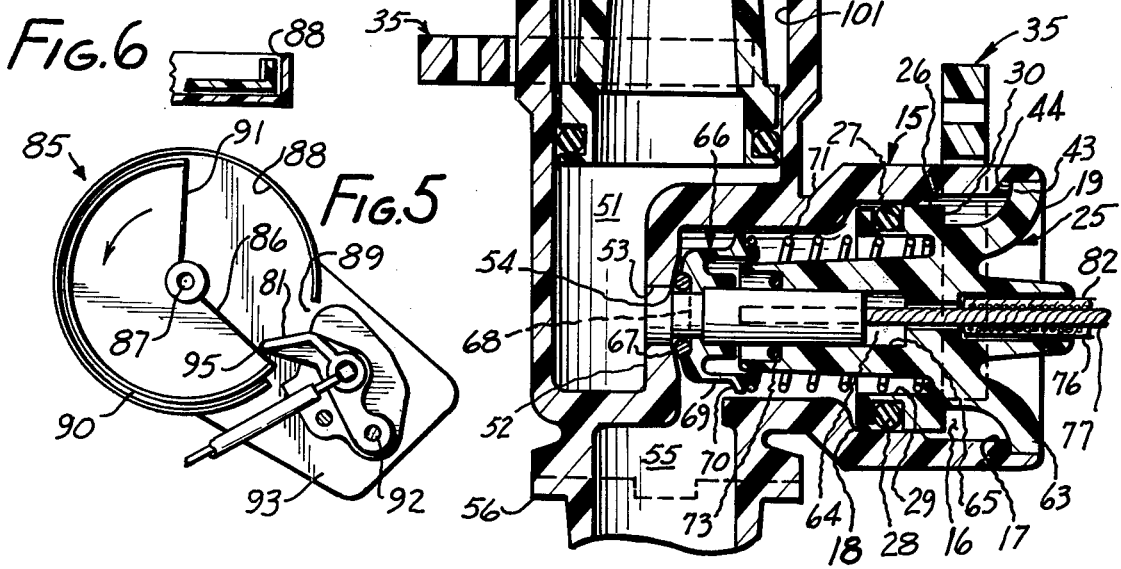

COUPLING FOR JOINING PARTS OF FLUID CONVEYING AND FLUID CONTROLLING DEVICES, AND VALVES UTILIZING SAID COUPLINGS

This invention relates to a coupling for joining parts of fluid conveying devices such as conduits, and fluid controlling devices such as valves. The invention also relates to devices utilizing said coupling.

Especially in the assembly of relatively complicated valves such as water-softener control valves, it is useful to build the valving from relatively small sub-assemblies to reduce the cost of the mold. However, when this is done, the cost of assembly can become so large as to make such arrangements impractical. It is an object of this invention to provide a coupling which can be utilized with parts of fluid conveying devices, quickly and reliably to join these parts together. This construction makes it practical to build structures with sophisticated and complicated functions from relatively simple sub-component parts.

It is another object of this invention to provide a camactuated valve which can be built from a number of lesser parts that are assembled by this coupling.

A coupling according to this invention comprises a receptacle, an internal receptacle wall, an internal peripheral sealing surface on said receptacle wall, said receptacle having an opening to the sealing surface, and said receptacle wall having a slit therethrough which opens onto said sealing surface. A coupled member is included in the coupling which has a peripheral sealing surface, a retention shoulder on the coupled member, the coupled member being insertable into the receptacle with the sealing surfaces in sealing contact with one another, and with the retention shoulder located past the slit. A coupler is engageable to the receptacle, the coupler including a key which passes throgh the slit whereby to engage the retention shoulder and to hold the coupled member in the receptacle.

According to a preferred but optional feature of the invention, the coupling has two of said slits, the slits facing each other across the receptacle wall, the coupler being provided with a pair of said keys which springly embrace the receptacle wall with a key in each of the slits and in engagement with the retention shoulder.

According to another preferred but optional feature of the invention, the coupling includes a poppet, and actuator means to move the poppet toward and away from a sealing seat. The actuator means comprises a cable that includes a sheath and a cable inside the sheath. The poppet is attached to the cable for movement therewith. Cam means is provided for shifting the cable in the sheath, said cam means comprising an anchor member and a camming member. The cable is attached to the camming member, and the sheath is attached to the anchor member and also to said coupled member.

The above and other features of this invention will be fully understood from the following detailed description and the accompanying drawings in which:

FIG. 1 is a plan view showing the presently preferred embodiment of the invention;

FIG. 2 is a top view of the left-hand portion of FIG. 1;

FIG. 3 is a cross-section taken at line 3—3 in FIG. 1;

FIG. 4 is a cross-section taken at line 4—4 in FIG. 2;

FIG. 5 is an illustration of a fragment of a part of FIG. 1; and

FIG. 6 is a cross-section taken at line 6—6 in FIG. 1.

In FIG. 1 there is shown a valve 10 under control of a timer 11. This valve is a poppet type on-off valve which permits or prevents flow of fluid therethrough. It is assembled by means of couplings according to this invention. Because all of the couplings are substantially identical, only one of them will be described in detail. This is coupling 15 shown in FIGS. 1-4. Coupling 15 includes a receptacle 16 constituting an impervious body such as molded plastic which includes an internal receptacle wall 17. This wall is circular and generally cylindrical although it may have a slight taper to permit removal of the molding core and also to provide for some pinch on a sealing ring yet to be described. The internal receptacle wall has a circular sealing surface 18. An opening 19 opens from the sealing surface to the side of the receptacle thereby giving access to the sealing surface. A pair of slits 20, 21 (FIG. 3) pass through the receptacle wall. They extend around less than the periphery of said wall for a purpose yet to be disclosed.

A coupled member 25 is intended to be attached to receptacle 15 as part of the completed coupling. It has an outer wall 26 with a ring groove 27 therein. The ring groove carries a sealing ring 28 with an outer periphery 29 (sometimes called a "peripheral sealing surface on said coupled member"). A retention shoulder 30 is formed on the coupled member. The coupled member is insertable into the receptacle through the opening so that the sealing surfaces make a continuous peripheral sealing contact with one another. When fully inserted, the retention shoulder stands past the slit.

A coupler 35 is engageable to the receptacle and also to the retention shoulder. The coupler comprises a clip 36 with a pair of keys 37, 38. The coupler is preferably an integral molded product with the keys being somewhat springily flexible and inherently biased toward one another in the sense that it requires energy and effort to spring them apart. The keys have flanges 39, 40 respectively which have a dimension D between their tips which is smaller than the dimension E which is the outside diameter of the outer wall 41 of the coupled member to which the coupler is applied.

Preferably, the flanges also have portions separated by a dimension F which interferes with the removal of the key and also tends to center the key on the coupled member. A hole 42 is provided as a hand or grip hold for assembly and disassembly. It will thereby be seen that the keys of the clip form a dimensional interference with the coupled member which must be overcome by springing the keys apart when assembling the coupling and which resists the disassembly of the coupling. However, the coupling is readily assembled and disassembled simply by snapping the clip on and snapping it off.

A limit stop 43 is provided which abuts against a limit shoulder 44, thereby establishing the inner-most possible position of the coupled member in the receptacle. The coupler will define its outer-most position. It is evident that the relative diameter of the free O-ring will be somewhat larger than the internal diameter of the sealing surface 18 of the receptacle in order to provide a proper sealing squeeze on the O-ring.

The coupling system can be utilized to build up larger assemblies such as the valve structure shown in FIGS. 1 and 4. For example, coupling 15 has a passage 51 and a passage 55. A valving wall 52 is formed with a valving port 53 therethrough. A valve seat 54 is shown on the right-hand side of the valving wall in FIG. 4. Passage 55 extends away from the valve seat to provide for through flow, and can form part of a coupled member 56 shown at the bottom of FIG. 1 which can be incorporated into still another coupling.

It is also evident that coupling 15 with the valve seat can be utilized to incorporate into the apparatus a flow control feature. Coupled member 25 includes additional functional features, in this case a valve actuator means. For this purpose, the coupled member carries a nose 63 with a passage 64 therethrough. Wall 65 of said passage forms a guide for a poppet 66 which is axially slidable therein. The poppet carries a valve seal 67 in the form of an O-ring seated in a sink 68 in the end thereof. The poppet has a skirt 69 which overhangs the end of the nose, and a flange 70 against which a bias spring 71 bears. The bias spring also bears against the bottom of a spring groove 72 in the nose, whereby the valve seal 67 is biased toward valve seat 54 so as normally to close the valve. An O-ring seal 73 seals between the poppet and the nose.

A cable assembly 75 is provided for determining, with the bias spring, the control position of the valve (i.e., whether the valve is open or closed). It includes a flexible sheath 76 and a cable 77 that is slidable inside the sheath. The sheath is attached to the coupled member and is also attached to an anchor member 80 yet to be described. The cable is fixed to the poppet. It is also connected to a cam follower 81. Therefore relative axial motion between the cable and the sheath will result in equal axial motion between the poppet and the nose, and more particularly between the valve seal and the valve seat. A spring reinforcement 82 is molded into the material of the sheath so as to reinforce it against axial stress and against kinking.

For the purpose of controlling the condition of the valve, a timer mechanism 85 such as a clock or the like turns a cam 86. Cam 86 is rotary-mounted to a shaft 87 driven by the timer mechanism, and fits inside a peripheral shoulder 88 with a cut-out portion 89. The cam itself has a peripheral cam face 90 and a cut-out portion 91 where the cam face does not exist. Cam follower 81 is pivoted by pin 92 to base 93. The anchor member 80 is also attached to the base, whereby the cam follower can swing in arc 94. The cam follower has a finger 95 which can track against the cam. In FIG. 1 the system is shown in the valve-open condition. When the finger does not contact the peripheral cam face 90 the bias spring 71 moves the valve seal toward closure, and pulls on the cable, and in doing so, pivots the follower to the position shown in FIG. 5. Thus, rotation of the cam results in the cam follower's assuming one of two positions. It is evident that different numbers of cut-out portions could be provided at different portions of the periphery of the cam and that different cam arrangements could be provided. Suffice it to say that this example shows that utilizing the coupler of the invention it is possible readily to join units of valves to other constructions which not only provide for through flow but also or instead for controlled flow as a function of time or otherwise. It is evident that instead of cam actuation a manual actuation of the cam follower is possible as is the use of a switch that moves the cable, or even directs operation of the valve.

Another coupling 100 is shown which provides for flow into the assembly. It includes a receptacle 101 which can be cast integrally with receptacle 16, if desired. A coupled member 102 can be coupled to receptacle 101. It has no valve or other control means. Instead a passage 103 through the coupled member provides for fluid flow into the assembly. The assembly feature of both couplings are substantially identical. These couplings are merely adapted to different uses.

This invention thereby provides an elegantly simple means for building up fluid flow devices with relatively sophisticated functions. For example, the device of FIG. 1 is useful in a timer-controlled water softener control valve.

This invention is not to be limited by the embodiment shown in the drawings and described in the description, which is given by way of example and not of limitation, but only in accordance with the scope of the appended claims.

I claim:

1. Cam-actuated fluid flow controlling and coupling apparatus, comprising:

a receptacle, an internal receptacle wall, an internal peripheral sealing surface on said receptacle wall, said receptacle wall having a slit therethrough, and a flow passage to and a sealing seat facing into the region bounded by the respective sealing surface;

a coupled member, a peripheral sealing surface on said coupled member, a retention shoulder on said coupled member, said coupled member being insertable into said receptacle with the sealing surfaces in sealing contact and the retention shoulder past the slit, and further including a poppet;

a coupler engageable to the receptacle, said coupler including a key which passes through the slit to engage the receptacle and the retention shoulder whereby to hold the coupled member in the receptacle; and actuator means to move said poppet toward and away from said seat, said actuator means comprising a cable that includes a sheath and a cable inside the sheath, said poppet being attached to said cable for movement therewith, cam means for shifting the cable in the sheath, said cam means comprising an anchor member and a camming member, the cable being attached to the camming member, and the sheath being attached to said anchor member and to said coupled member, a timer, a cam driven by said timer and contactible by the camming member, whereby to establish the position of the poppet as a function of the cam contour and position, and thereby also as a function of time as determined by the timer.

2. Apparatus according to claim 1 in which the cam is rotary.

* * * * *